Sept. 8, 1925.  1,552,940
G. M. AURELE
HAND OPERATED MOWING MACHINE
Filed May 29, 1922
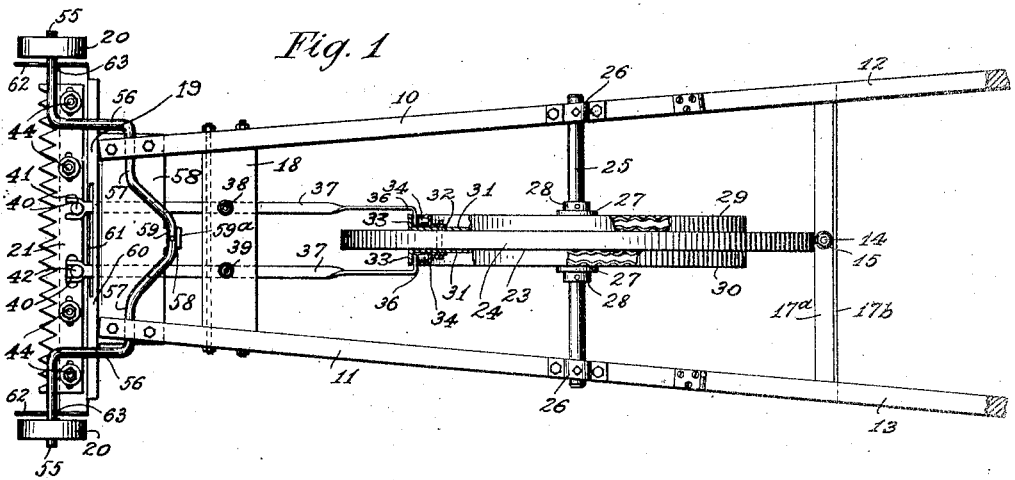
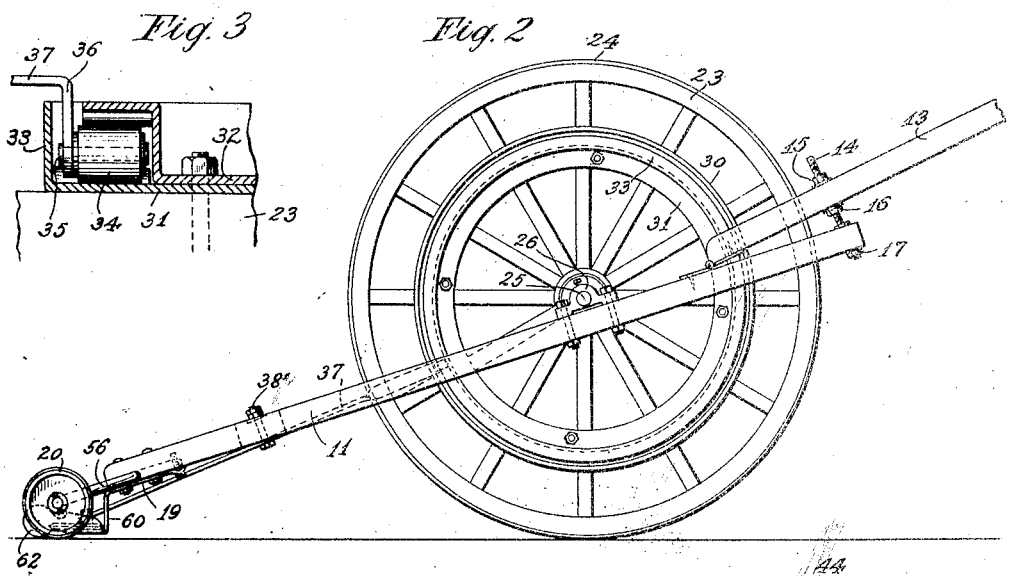
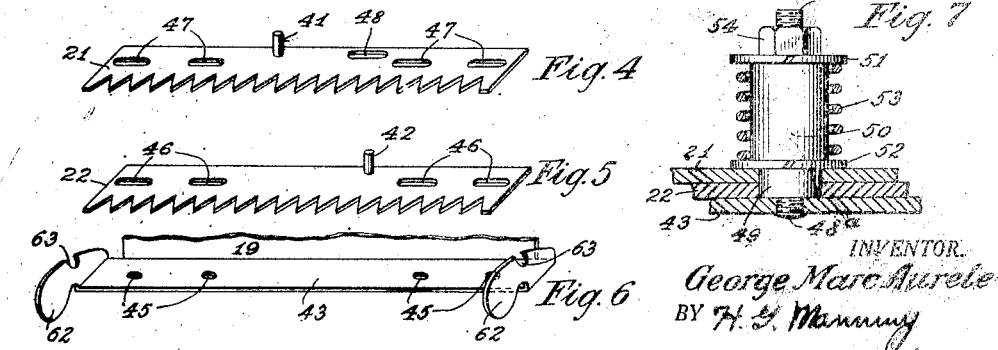
INVENTOR.
George Marc Aurele
BY H. G. Manning
ATTORNEY Patented Sept. 8, 1925.

1,552,940

UNITED STATES PATENT OFFICE.

GEORGE MARC AURELE, OF MERIDEN, CONNECTICUT.

HAND-OPERATED MOWING MACHINE.

Application filed May 29, 1922. Serial No. 564,472.

*To all whom it may concern:*

Be it known that I, GEORGE MARC AURELE, a citizen of the United States, and a resident of Meriden, county of New Haven, and State of Connecticut, have invented certain new and useful Improvements in Hand-Operated Mowing Machines, of which the following is a specification.

This invention relates to mowing machines, and more particularly to a machine for cutting hay, wheat, oats, etc., in places which are inaccessible to the ordinary horse-driven or motor-driven machines.

One object of this invention is to provide a manually operated mowing machine driven by a single traction wheel having opposed cam-tracks for operating a pair of levers adapted to reciprocate a pair of cutter blades.

A further object is to provide a mowing machine having improved means for resiliently holding the reciprocatory cutting blades in yieldable contact with one another.

A further object is to provide a mowing machine having a pair of opposed vertical cam-tracks mounted on opposite sides of a traction wheel and arranged to vibrate a pair of levers mounted on spaced pivots for simultaneously reciprocating in opposite directions a pair of cutter blades.

A further object is to provide a manually operated mowing machine manipulated by a pair of handle bars which are pivoted to the frame of the machine, and which may be raised or lowered to any desired adjusted position.

A further object is to provide a mowing machine of the above nature which will be simple, cheap to manufacture, easy to manipulate, and very efficient and durable in use.

With these and other objects in view, there has been illustrated on the accompanying drawings one form in which the invention may be conveniently embodied in practice.

Fig. 1 represents a top plan view of the mowing machine, certain parts being broken away for clearness.

Fig. 2 is a side elevation of the same.

Fig. 3 is a sectional view of one of the cam-tracks, together with the end of the lever engaged thereby.

Fig. 4 is a perspective view of the upper cutter blade.

Fig. 5 is a perspective view of the lower cutter blade.

Fig. 6 is a perspective view, with parts broken away, of the frame which holds the cutter blade and supports the front wheels or rollers.

Fig. 7 is a sectional view of one of the spring tension members for resiliently holding the cutter blades in contact with one another.

Referring now to the drawings in which like reference numerals denote corresponding parts throughout the several views, the numerals 10 and 11 represent the side members of the inclined frame of the machine. The members 10 and 11 are preferably constructed of wood or other similar material and have hinged thereto, at their upper ends, a pair of adjustable handle bars 12 and 13.

The handle bars 12 and 13 are adapted to be elevated and depressed with respect to the frame by means of a bolt 14 having nuts 15, 16, 17 threaded thereon, said bolts passing through a pair of cross bars 17$^a$ and 17$^b$ connecting the handle bars 12 and 13 and the side members 10 and 11 respectively. The side members 10 and 11 preferably converge downwardly and are connected near their bottom ends by a pivot bar 18. Secured to the lower ends of the side members 10 and 11 is a base member 19 which is adapted to support the front wheels or rollers 20 as well as the cutter blades 21 and 22.

A traction wheel 23 having a suitable metal tire 24 is journaled on the horizontal stationary axle 25, the latter being non-rotatably mounted in suitable collar members 26, 26, which are bolted or otherwise secured to the side members 10 and 11. The hub 27 of the traction wheel is adapted to rotate upon the axle 25, and is held from slipping sidewise thereon by means of the flanges 28, 28.

Concentrically arranged between the outer rim and hub of the traction wheel 23 are two pairs of opposed vertical cam-track members 29 and 30. Each of the cam-track members 29 and 30 comprises a flat inner ring member 31 and an outer ring 32, secured to said flat ring 31 in any suitable manner as by bolts. The flat ring 31 is adapted to lie adjacent the wheel in engagement with the spokes, and is provided with an outer dust-excluding flange 33 for preventing the access of dust or other injurious material. The ring 32 is Z-shaped and of only about one-half the width of the flat ring 31.

The parallel vertical portions of the rings 31 and 32 adjacent the flange 33 are provided with an endless series of radial corrugations arranged in staggered relation to each other.

A roller 34 is provided in each cam-track and is pivotally mounted on a pin 35 secured to a down-turned extension 36 of a lever 37. The levers 37 which actuate the cutter blades 21 and 22 are pivoted on a pair of bolts 38 and 39 which pass through the cross bar 18 and are arranged at right-angles thereto. These levers 37 have their lower ends forked, as at 40, to engage about studs 41 and 42 formed integral with the cutter blades 21 and 22 respectively. It will be evident from the above description that the rotation of the drive-wheel, through the medium of the cam-track members 29 and 30 will cause the levers 37 to vibrate rapidly about their pivots, the arrangement of the parts being such that the cutter blade 21 is always moving in a direction opposite to that of the cutter blade 22.

The cutter blades 21 and 22 are adapted to slide upon a finger bar 43 of the frame 19 and are resiliently pressed together by means of a series of adjusting spring bolts 44—four in this instance. These spring bolts 44 are preferably threaded into suitable tapped holes 45 in the finger bar 43, and are loosely fitted in a series of elongated slots 46 and 47 in the cutter blades 22 and 21 respectively. The upper cutter blade 21 is also provided with an additional slot 48 adapted to fit loosely around the stud 42 of the lower cutter blade.

In order to more firmly secure the spring bolts 44 to the finger bar 43, the lower ends of said bolts are provided with heads 48ª arranged to seat against the lower surface of the finger bar. Each spring bolt 44 also has a spacing ring 49, a spring bushing 50, and a pair of split spring-thrust washers 51 and 52, mounted thereon. The spacing ring is adapted to slide in the slots 46 and 47. The bottom washer 52 is adapted to be pressed down upon the upper cutter bar 21 by a spiral spring 53 located on said bushing 50 between said washers 51 and 52. The upper washer 51 is adapted to be held in position by means of a nut 54 screwed upon the threaded top of the bolt 44 as clearly shown in Fig. 7.

As will be evident, the tension of the spring 53 will hold the cutter bars 21 and 22 constantly in contact with one another, yet in case of accidental clogging by stones or other hard materials, the cutter members will yield sufficiently to prevent serious damage or possible breakage.

The side rollers 20, previously mentioned, are carried on horizontal extremities 55 of a roller-supporting bar, as most clearly shown in Fig. 1. Adjoining the extremities 55, the roller-supporting bar is provided with backwardly extending and upwardly inclined sections 56 arranged at right angles to the portions 55 and terminating in the inwardly directed horizontal portions 57, the latter being held within suitable apertures in the bottom of the side members 10 and 11 by an upper apron portion 58 of the base 19. The horizontal portions 57 are connected by a curved rear section 59, substantially semicircular in shape, which is itself secured to a lug 59ª on the top of the apron portion 58 by a bolt or other suitable fastening means. The apron portion 58 of the base is connected to the finger bar 43 by means of a substantially vertical section 60, having an elongated slot 61 to receive the forward ends of the levers 37 immediately behind the forked ends 40 of said levers. Forwardly extending guard fingers 62 are provided at each side of the finger bar 43. These guard fingers 62 have notches 63 in their upper surfaces to receive the outer extremities 55 of the roller-supporting bar.

In operation, when it is desired to cut the hay or other crop, a person using the machine will grasp the two handles 12 and 13 in the manner of a wheel-barrow, and push the machine forward. The front rollers 20 merely ride over the ground at the sides of the cutters, while the large central traction wheel 23 by means of the cam-tracks 29 and 30 will give a vibratory motion to the levers 37 about their pivots 38 and 39, causing the lower forked ends of said levers 37 to oscillate the cutter bars 21 and 22.

It will thus be seen that a simple form of hand-operated mowing machine has been provided which is positive in operation, which has no complicated system of gearing, and which can be pushed over the ground with the minimum amount of effort, without requiring the person operating it to bend over.

While there has been disclosed in this specification one form in which the invention may be embodied, it is to be understood that this form is shown for the purpose of illustration only, and that the invention is not to be limited to the specific disclosure, but may be modified and embodied in various other forms without departing from its spirit. In short, the invention includes all the modifications and embodiments coming within the scope of the following claim.

Having thus fully described the invention, what is claimed as new, and for which it is desired to secure Letters Patent, is:

In a mowing machine, a frame, a traction drive wheel mounted in said frame, a pair of cooperating reciprocatory cutter blades mounted adjacent the ground at the forward end of said frame, a pair of levers pivoted in said frame and connected to said cutter blades, said drive wheel having on each outer face a flat annular plate provided with a sinuous cam track, each of said plates having an overhanging angular ring secured thereto, said ring having a sinuous cam track cooperating with the cam track of said flat plate, an opening being left between the peripheries of said plate and ring, the edge of said flat plate having a lateral dust-excluding flange for substantially closing said opening, one of said levers having its free end offset and disposed between said cam tracks, whereby it will be vibrated by the rotation of said drive wheel and will reciprocate one of said cutter blades.

In testimony whereof, I have affixed my signature to this specification.

GEORGE MARC AURELE